United States Patent
Munk-Hansen

(10) Patent No.: US 8,890,348 B2
(45) Date of Patent: Nov. 18, 2014

(54) NACELLE FOR A WIND TURBINE

(75) Inventor: Thorkil Munk-Hansen, Give (DK)

(73) Assignee: Siemens Aktiengesellschaft, Munich (DE)

(*) Notice: Subject to any disclaimer, the term of this patent is extended or adjusted under 35 U.S.C. 154(b) by 142 days.

(21) Appl. No.: 13/613,494

(22) Filed: Sep. 13, 2012

(65) Prior Publication Data
US 2013/0243569 A1 Sep. 19, 2013

(30) Foreign Application Priority Data
Sep. 22, 2011 (EP) .................................... 11182332

(51) Int. Cl.
*F03D 9/00* (2006.01)
*F03D 1/00* (2006.01)
*F03D 11/00* (2006.01)

(52) U.S. Cl.
CPC ................ *F03D 9/002* (2013.01); *F03D 1/005* (2013.01); *F05B 2260/20* (2013.01); *F03D 11/005* (2013.01); *F05B 2560/406* (2013.01); *Y02T 50/675* (2013.01); *F05B 2240/14* (2013.01); *Y02E 10/725* (2013.01); *F03D 1/001* (2013.01); *Y02E 10/722* (2013.01); *Y02E 10/728* (2013.01); *Y02E 10/726* (2013.01)
USPC .............................................. 290/44; 290/55

(58) Field of Classification Search
CPC ...................................................... Y02E 10/726
USPC ....................... 290/44, 55; 416/204 R, 244 R
See application file for complete search history.

(56) References Cited

U.S. PATENT DOCUMENTS

| 8,011,893 | B2* | 9/2011 | Stiesdal | .................... 416/204 R |
| 2005/0230979 | A1 | 10/2005 | Bevington | |
| 2009/0129931 | A1* | 5/2009 | Stiesdal | .................... 416/204 R |
| 2011/0008166 | A1 | 1/2011 | Roed | |
| 2011/0163543 | A1 | 7/2011 | Tsutsumi | |
| 2012/0308383 | A1* | 12/2012 | Sabhapathy | ...................... 416/1 |

FOREIGN PATENT DOCUMENTS

EP 2063119 A2 5/2009

* cited by examiner

*Primary Examiner* — Tho D Ta

(57) ABSTRACT

Disclosed is a nacelle for a wind turbine which includes a generator, a load-carrying structure, a support structure, an electrical system, a yaw system, a control system and a housing. The generator includes a rotating part and a stationary part and the stationary part is connectable to the load-carrying structure. The load-carrying structure includes the yaw system and the control system. The support structure includes the electrical system and the support structure is connectable to the load-carrying structure. The housing is segmented and is connectable to at least the load-carrying structure. The generator, the load-carrying structure and the support structure are separate modules and the separate modules and the segmented housing are connectable at an erection site of the wind turbine to build the nacelle.

14 Claims, 5 Drawing Sheets

NACELLE FOR A WIND TURBINE

CROSS REFERENCE TO RELATED APPLICATIONS

This application claims priority of European Patent Office application No. 11182332.4 EP filed Sep. 22, 2011. All of the applications are incorporated by reference herein in their entirety.

FIELD OF INVENTION

The disclosure relates to a nacelle for a wind turbine.

BACKGROUND OF INVENTION

A wind turbine transforms wind energy into electrical energy.

The wind energy causes a rotation of the rotor of the wind turbine. The rotor of the wind turbine comprises a hub and at least one rotor blade mounted to the hub. The hub is connected rotatable to the nacelle. The nacelle comprises an electrical generator. The rotation of the hub is transferred to the generator and the generator transfers the rotational energy into electrical energy.

The loads of the wind acting on the rotor are transferred over one or more bearings to a load-carrying structure. The load-carrying structure is a part of the nacelle and connects the nacelle to the tower of the wind turbine. The loads and the weight of the components of the rotor and the nacelle are transferred to the tower.

The load-carrying structure is connected to a tower in a way that the nacelle may be rotated on the tower. A yaw system rotates the nacelle on the tower in a way that the rotor of the wind turbine faces the direction of the wind.

A wind turbine comprises different systems and components that are necessary for the operation of the wind turbine like a control system or a cooling system. The systems and components are connected by electrical connections, hydraulic connections or fluid tight pipes for example for the cooling system. Most of the systems and components are located in the nacelle of the wind turbine.

Some of the systems and components, like the electrical system, are mounted on a support structure. The support structure is connected to the load-carrying structure of the nacelle.

The nacelle of a wind turbine proves to be a critical part in respect of the operational reliability and life-time of the wind turbine. The nacelles of wind turbines are produced in an in-line-production in the factory to achieve a cost effective production and a high quality. The nacelle is then shipped to the erection site of the wind turbine.

In recent year the effective electrical power generated with a single wind turbine continuously increased. The components of the wind turbine, like the blades, the hub, the nacelle and segments of the tower also increased in size and weight.

The size and weight of the single parts of the wind turbine are limited due to the regulations for the transport of the parts on public roads. This is also the case for the nacelle of the wind turbine.

The transport on public roads requires a certain maximum size of the components and specialized transport vehicles. In addition a special heavy-load transport requires a long period for planning and to get the required permission from the authorities.

SUMMARY OF INVENTION

It is the aim of the disclosure to provide a nacelle for a wind turbine that is easier to be transported.

The aim is reached by the features of the independent claim. Embodiments are described in the dependent claims.

A Nacelle for a wind turbine comprises a generator, a load-carrying structure, a support structure, an electrical system, a yaw system, a control system and a housing. The generator comprises a rotating part and a stationary part and the stationary part is connectable to the load-carrying structure.

The load-carrying structure comprises the yaw system and the control system. The support structure comprises the electrical system and the support structure is connectable to the load-carrying structure. The housing is segmented and is connectable to at least the load-carrying structure.

The generator, the load-carrying structure and the support structure are separate modules and the separate modules and the segmented housing are connectable at an erection site of the wind turbine to build the nacelle.

The nacelle of a wind turbine comprises a load-carrying structure that is capable to transfer the loads from the rotor of the wind turbine to the tower. When the turbine is erected, the stator side of the generator is mounted to a first side of the load-carrying structure. The second side of the load-carrying structure is rotatable mounted to the tower of the wind turbine.

The nacelle of a wind turbine comprises a support structure that carries systems and components present in the nacelle. When the turbine is erected, the support structure is connected to the load-carrying structure of the nacelle.

Systems and components in the nacelle of the wind turbine may either be connected directly to the load-carrying structure or indirectly for example via a support structure.

The electrical system of the wind turbine is at least partially located in the nacelle of the wind turbine. These parts are for example the converter, the transformer or cabinets with electrical and electronic equipment.

The nacelle of the wind turbine comprises a control system. The control system controls for example the electrical system, the hydraulic system, the pitch of the rotor blades, the yaw system of the nacelle, the brake of the rotor and the converter of the wind turbine.

The nacelle comprises a housing that is constructed to protect the systems and components in the nacelle from the influence of the surrounding environment. The housing of a larger nacelle is segmented for an easier transport.

The nacelle is prepared as separate modules. Those modules are transported to the erection site of the wind turbine and are connected to build the nacelle of the wind turbine.

The modules are either connected before the nacelle is lifted up on the tower of the wind turbine or the modules of the nacelle are lifted up separately and are then connected to each other.

The modules may also be connected at an erection site of the wind turbine where the nacelle is erected. This can be near a harbor for example. The nacelle is then transported to the tower and lifted up onto the tower.

The modules are transported, thus they need to fulfill the requirements and limitations of transportation. Thus the complete nacelle may be larger then the maximum size limited by the transportation regulations. Thus more space is available in the nacelle.

Thus the systems and components may be arranged in a more useful way to optimize cooling of the components. Thus the components may also be arranged in a way to optimize service and maintenance work performed in the nacelle.

Thus the modules of the nacelle are lighter in weight then the whole nacelle. Thus the modules are easier to transport and easier to handle. Thus the transportation vehicle may be a normal transportation vehicle and does not need to be a special heavy-load vehicle. Thus the transport of the modules is cheaper.

The transport of the modules may at least for some of the modules be performed as a normal transport on public roads. Thus it is not necessary to arrange a special heavy-load or wide load transport for those modules.

A system present in the nacelle of the wind turbine comprises connections to different components. The cooling system for example comprises a pump and a control unit and is connected to a heat exchanger and at least one heat source.

Connections need to be established from the module that comprises a part of the system to the other modules that comprise other components of that system. The module to which the system is mounted is chosen in a way the number of connections that are needed between the modules is minimized.

The load-carrying structure for example comprises the yaw system including the control of the yaw motors. The yaw motors are connected to the load-carrying structure. Thus no connections from one module to another module are needed to connect the yaw motors to the control of the yaw motors.

The load-carrying structure comprises the control system of the wind turbine. The control system needs to be connected to a lot of different components of the wind turbine. The load carrying structure is the central module of the modules of the nacelle.

Thus by placing the control system in the load-carrying structure the number of connections of the control system to the other modules is minimized.

Thus the number of connections that have to be made when the modules are connected is minimized. Thus installation time is minimized. Thus also the possibility of a faulty connection is minimized.

The connections that have to be established when the modules are connected are prepared in a way that they are easily connectable. The connections may be prepared by providing a connecting piece in the connection.

Thus the connections may be established fast when the modules are connected. Thus no further installation material is needed at the erection site of the wind turbine to establish the connection.

In an embodiment the load-carrying structure may comprise at least a part of a cooling system.

The nacelle comprises a cooling system. The cooling system is constructed to transfer the heat present in the components to a heat exchanger, where the heat is transferred to another cooling medium like the ambient air.

A part of the cooling system is for example the pump of the cooling system, a valve of the cooling system or a connection of the cooling system.

The part of the cooling system may also be the control of the cooling system. When the control of the cooling system is located in the load-carrying structure the number of connections that have to be established when the modules are connected is minimized.

Thus the connections to connect the parts of the cooling system are established very quickly, and the risk of a faulty connection is minimized. Thus the installation time is minimized.

In an embodiment a radiator may be provided which is connectable to the housing.

A radiator is used as a heat exchanger and is a part of the cooling system. The heat from for example the generator is transported by a first cooling fluid. In the radiator the heat from a first cooling fluid is transferred to a second cooling fluid. The second cooling fluid is for example the ambient air.

The radiator is provided connectable to the housing. Thus the radiator may be transported separate from the other modules to the erection site of the wind turbine.

Thus the parts of the housing that need to be transported are smaller and the transport of the housing of the nacelle is easier.

In an embodiment the generator may comprise a hydraulic unit mounted to the stationary part of the generator.

A nacelle comprises a hydraulic system. The hydraulic system is used for example to operate the brake and lock of the rotor of the wind turbine or to control the pitch of a rotor blade.

A hydraulic unit is for example a pump of the hydraulic system or a pressure-storage. The hydraulic unit needs to be connected to the brake and the hub of the nacelle. The hydraulic unit is mounted to the stationary part of the generator.

Thus the number of connections needed to connect the hydraulic unit with the other hydraulic components is minimized. Thus the connections may be established fast.

In an embodiment the electrical system comprises a transformer and a converter, to adapt the power of the generator to apply to a power grid condition of a power grid.

The nacelle comprises an electrical system that transfers the electrical energy from the generator to a connection to the power grid. This electrical system comprises a transformer and a converter, which may be located in the nacelle.

The converter and the transformer are both located in the nacelle of the wind turbine. Thus the connection between the converter and the transformer is short. Thus the connection may already be installed when the module is prepared. Thus no separate connection has to be established at the construction site.

In an embodiment a platform to be used with a helicopter is provided that is connectable to the housing.

A platform to be used with a helicopter is a heli-pad, a heli-drop zone or a heli-hoist platform for example.

The platform may be a heli-hoist platform. A heli-hoist platform is a platform constructed to lower parts or personnel from a helicopter to the platform or to hoist them up from the platform to the helicopter.

The platform may be segmented. The platform is prepared separate from the housing of the nacelle and is connected to the housing at the erection site.

Thus the parts of the housing that need to be transported are smaller and the transport of the housing of the nacelle is easier.

In an embodiment the electrical system is electrically connectable to the generator and the power grid.

The electrical system of the wind turbine is prepared in a way that it may be connected to the generator and the power grid. The connection is prepared by providing the cables that are needed for the connection in the modules. The cables may be equipped with a connector or they may be provided long enough to be guided into the adjacent module to be connected directly to the concerning component.

Thus the connection may be established at the erection site of the wind turbine. Thus no further installation equipment is needed at the erection site.

In an embodiment a pipe or hose of the cooling system is connectable to the radiator, the generator and/or the electrical system.

The cooling system transfers the excess heat from the components of the wind turbine via a first cooling fluid to the heat exchanger. A typical source of excess heat may be the generator, the main bearing, the converter, the transformer or the hydraulic system for example.

The cooling system is connected to all heat sources that need to be cooled and to the radiator acting as a heat exchanger.

A connection has to be established between the cooling system present in one of the modules, the radiator and the units that need to be cooled.

A hose or pipe is provided as a connection between the cooling system and the radiator or the cooling system and the units that need to be cooled. This hose or pipe is connectable to the mentioned units in the different modules. So the connection may be established after the modules are connected.

Thus the connection is already prepared. Thus the connection may be established in a quick and easy manner.

In an embodiment at least the generator and the electrical system of the support structure are constructed to be connected by an electrical connection.

The electrical connection is prepared and arranged in the modules before the modules are connected.

After the modules are connected the electrical connection may be established by connecting the prepared cables or busbars, or connecting a prepared plug and socket type connection.

Thus the connection may be established very quickly. The preparation of the connection may be performed in advance in a factory. Thus the installation time on the erection site of the wind turbine is minimized. Thus the preparation may be performed independent of the weather conditions.

In an embodiment at least the cooling system in the load-carrying structure, the generator and the electrical system of the support structure are constructed to be connected by a connection for a cooling fluid.

Thus the cooling system may be connected to the generator and the electrical system. Thus the generator or the electrical system may be cooled by the cooling system.

In an embodiment at least the hydraulic unit at the generator and the control system of the support structure are constructed to be connected by a hydraulic connection.

Thus the hydraulic unit and the control system may be connected by a hydraulic connection.

Thus the hydraulic system may be controlled by the control system.

In an embodiment at least the hydraulic unit at the generator and a hydraulic component outside of the nacelle are constructed to be connected by a hydraulic connection.

A hydraulic component outside of the nacelle is for example a hydraulic pitch system located in the hub.

Thus also hydraulic components outside of the nacelle may be connected to the hydraulic system. Thus the pitch system may be controlled hydraulically.

In an embodiment at least the control system in the load-carrying structure, the generator and the electrical system in the support structure are constructed to be connected by an electrical connection.

The electrical connection is prepared before the modules are connected. The preparation is done in a factory and in thus independent from weather conditions at the erection site of the wind turbine.

When the modules are connected the electrical connection may be established by connecting prepared cables or connecting a prepared plug and socket connection.

Thus the connection may be established very quickly. Thus installation time at the erection site of the wind turbine is saved.

In an embodiment at least the control system and a component outside of the nacelle are constructed to be connected by an electrical connection.

A component outside of the nacelle that is connected to the control system is for example the hydraulic pitch system in the hub or the flight warning lights or the meteorological instruments on top of the nacelle.

The electrical connection is established in advance before the modules are transported to the erection site of the wind turbine. Thus establishing the connection is independent from the weather conditions at the erection site of the wind turbine.

The electrical connection is established at the erection site of the wind turbine after the modules are connected. The connection may be achieved by connection the prepared electrical cables or connection the cables by a prepared plug and socket connection.

A nacelle for a wind turbine is assembled, wherein the separate modules and the segmented housing are connected at the erection site of the wind turbine by connecting the stationary part of the generator to the load-carrying structure.

And by connecting the support structure to the load-carrying structure and connecting the segments of the housing at least to the load-carrying structure.

BRIEF DESCRIPTION OF THE DRAWINGS

The disclosure is shown in more detail by the help of figures.

The figures show a configurations of various embodiments and do not limit the scope of the claims or disclosure.

Figure 1:
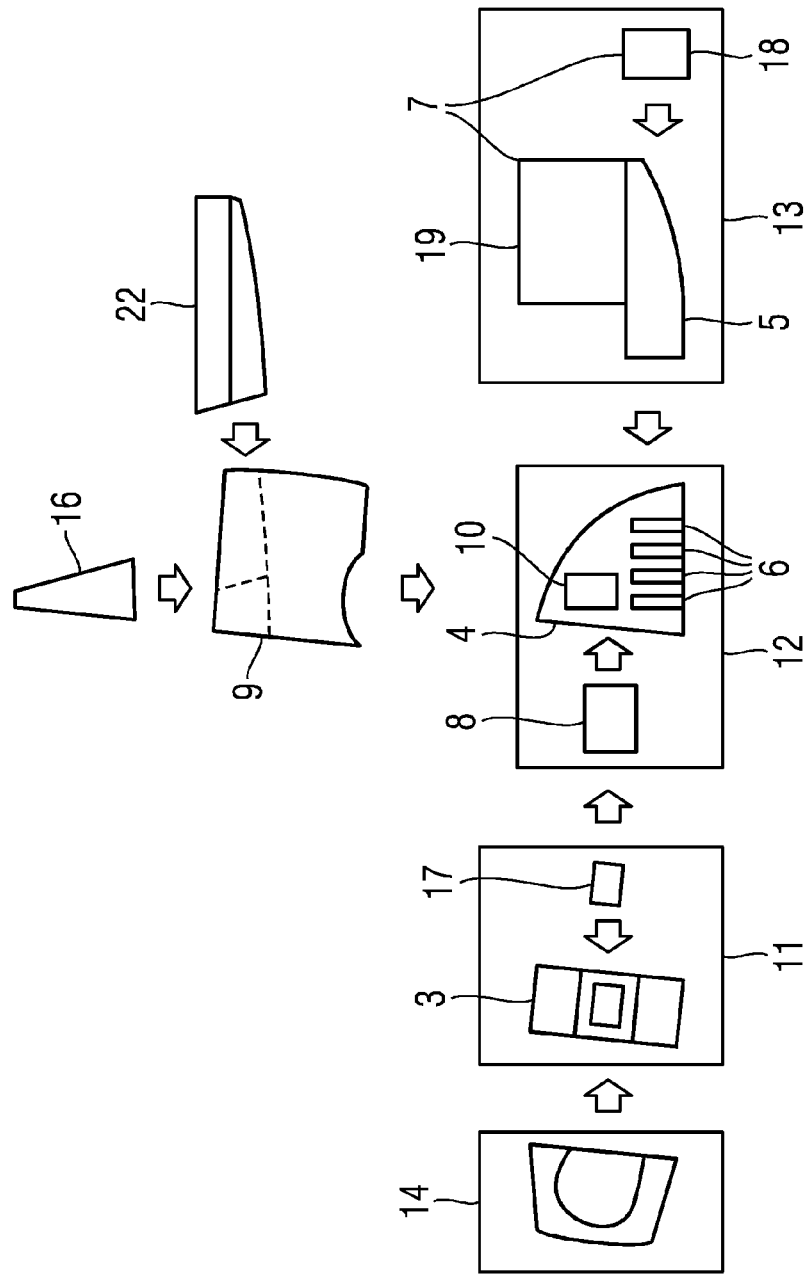
FIG. 1 shows a block diagram of a nacelle and a hub of a wind turbine.

Three major modules of the nacelle 11, 12, 13 are connected to form the nacelle. A first module 11 comprises a generator 3. A hydraulic pump 17 is located within the stationary part of the generator 3. The generator 3 with a hydraulic module 17 is transported to an erection site of the wind turbine separate from the other parts of the nacelle 2.

A second module 12 comprises a load-carrying structure 4. The load-carrying structure comprises a yaw system 6, a control system 8 and a cooling pump 10. The load-carrying structure with the yaw system 6, the control system 8 and the cooling pump 10 is transported to an erection site of the wind turbine separate form the other modules of the nacelle.

A third module 13 comprises a support structure 5. An electrical system 7, comprising a transformer 18 and a converter 19, is connected to the support structure 5.

The support structure 5 with the electrical system 7 is transported to an erection site of the wind turbine separate form the other modules of the nacelle 2.

At the erection site of the wind turbine 1 the modules 11, 12, 13 are connected. The module 13 is connected to the module 12, whereby the support structure 5 is connected to the load-carrying structure 4.

The module 11 is connected to the module 12, whereby the generator 3 is connected to the load-carrying structure 4.

A housing 9 of the nacelle is segmented. The segments are shown by the dotted lines at the housing 9.

The segments of the housing 9 are transported to an erection site of the wind turbine separate form the other modules of the nacelle 2.

At the erection site of the wind turbine 1 the segments of the housing 9 are mounted to the modules 11, 12, 13 of the nacelle 2.

Additional components like a radiator 16 and a platform to be used with a helicopter 22 are connected to the housing 9.

A hub 14 is connected to the nacelle 2, whereby the hub 14 is connected to the rotating part of the generator 3.

Figure 2:
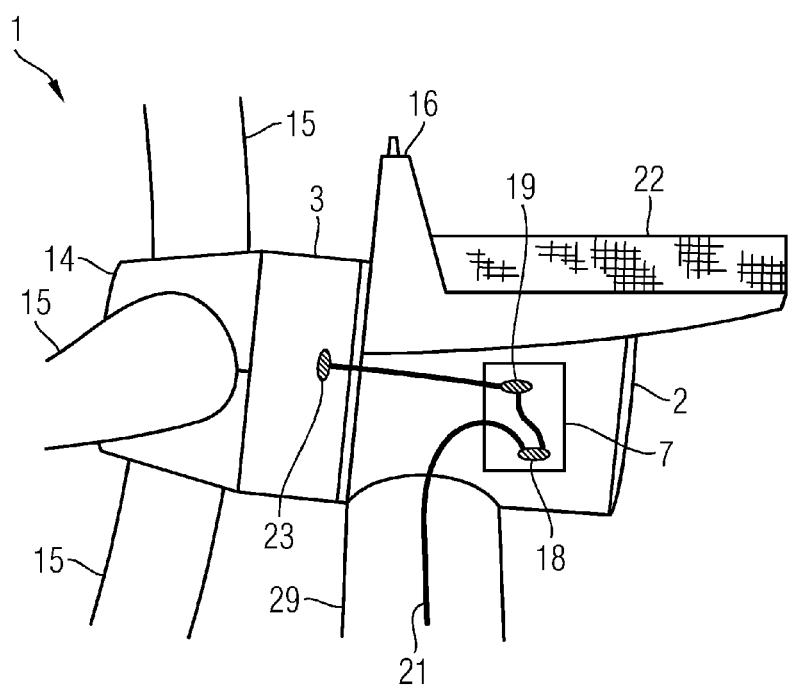
FIG. 2 shows a schematic overview of an electrical power system.

FIG. 2 shows a schematic overview of an electrical power system.

FIG. 2 shows a nacelle 2 of a wind turbine 1 on top of a tower 29. The wind turbine is equipped with a hub 14 and rotor blades 15. On top of the nacelle is a radiator 16 of a cooling system and a platform to be used with a helicopter 22. Connections of the electrical power system are shown in a schematic way.

The electrical power system comprises an electrical connection 23 from the generator 3 to the electrical system 7, which comprises the converter 19 and the transformer 18. An electrical connection is leading from the electrical system 7 to the power grid 21.

Figure 3:
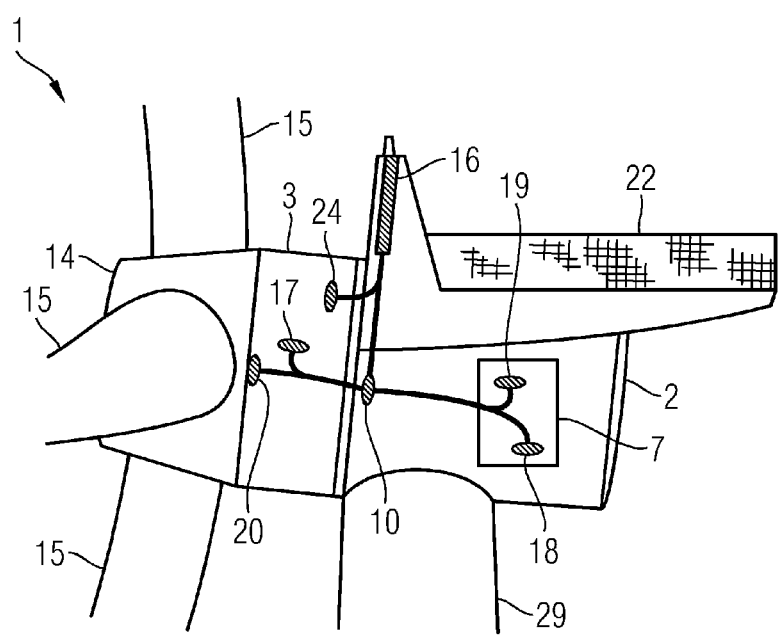
FIG. 3 shows a schematic overview of a cooling system.

FIG. 3 shows a schematic overview of a cooling system.

FIG. 3 shows a nacelle 2 of a wind turbine 1 on top of a tower 29. The wind turbine is equipped with a hub 14 and rotor blades 15. On top of the nacelle is a radiator 16 of a cooling system and a platform to be used with a helicopter 22.

Connections of the cooling system are shown in a schematic way.

The connections of the cooling system lead from a pump of the cooling system 10 to the electrical system 7 comprising the transformer 18 and the converter 19.

Another connection is leading from the cooling pump 10 to a hydraulic pump 17 in the generator and to the a bearing 20 of the wind turbine 1.

Even another connection is leading from the cooling pump 10 to the radiator 16 on top of the nacelle 2 and to a cooling connection 24 of the generator 3.

Figure 4:
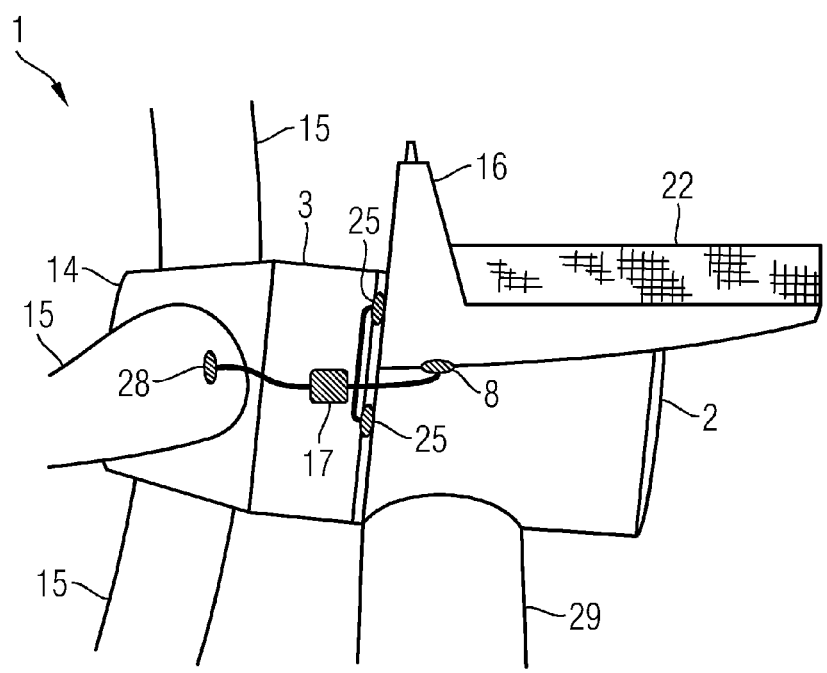
FIG. 4 shows a schematic overview of a hydraulic system.

FIG. 4 shows a schematic overview of a hydraulic system.

FIG. 4 shows a nacelle 2 of a wind turbine 1 on top of a tower 29. The wind turbine is equipped with a hub 14 and rotor blades 15. On top of the nacelle is a radiator 16 of the cooling system and a platform to be used with a helicopter 22.

Connections of a hydraulic system are shown in a schematic way.

A hydraulic pump 17 is located in the generator 3 of the wind turbine 1. A first hydraulic connection is leading from the hydraulic pump 17 to the brakes 25 of the generator 3.

A second connection is leading from the hydraulic pump 17 to the control system 8, which is controlling the hydraulic system.

A third hydraulic connection is leading from the hydraulic pump to a hydraulic system in the hub 14 of the wind turbine 1. In this example this is the connection to a hydraulic pitch system of the rotor blades 15.

Figure 5:
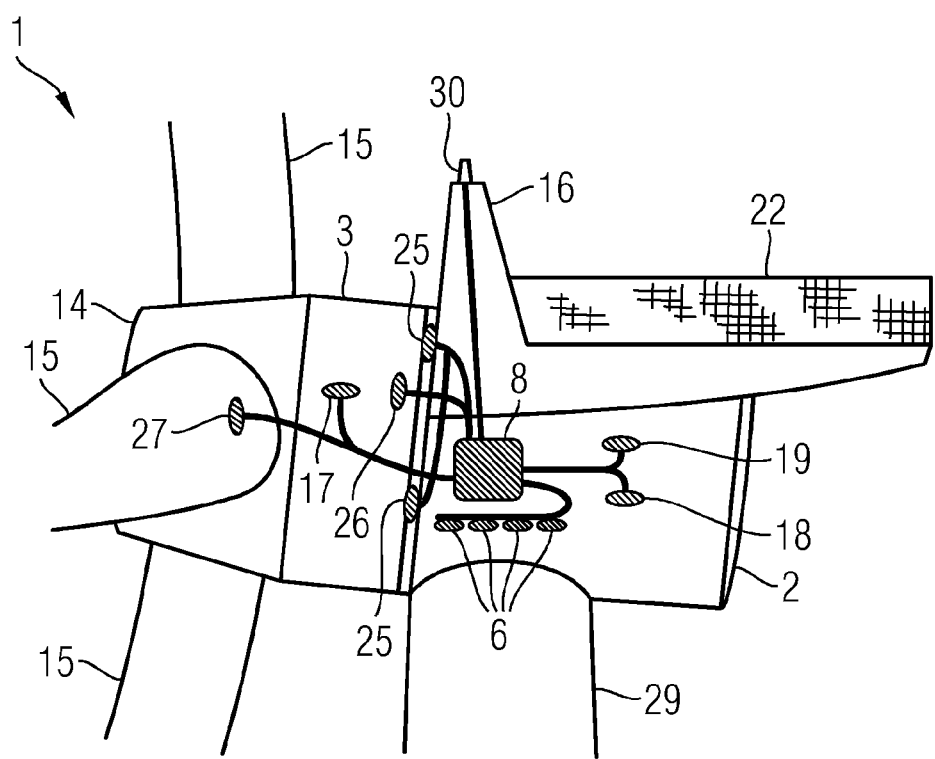
FIG. 5 shows a schematic overview of a control system.

FIG. 5 shows a schematic overview of a control system.

FIG. 5 shows a nacelle 2 of a wind turbine 1 on top of the tower 29. The wind turbine is equipped with a hub 14 and rotor blades 15. On top of the nacelle is a radiator 16 of the cooling system and a platform to be used with a helicopter 22.

Connections of a control system are shown in a schematic way.

The control system 8 of the wind turbine 1 is located in the load-carrying structure. The control system 8 has a connection to the yaw system 6, to the converter 19 and the transformer 18.

Another connection goes from a control system 8 to the top of the nacelle 30, where meteorological instruments and flight warning lights are connected.

The control system 8 further comprises a connection 26 to the generator 3, a connection to the hydraulic pump 17 and connection to the brakes 25 of the generator 3.

Another connection leads from the control system 8 to a component 27 in the hub 14 of the wind turbine 1. This component 27 is for example a hydraulic pitch system of the rotor blades 15 of the wind turbine 1.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A nacelle for a wind turbine comprising:
   a load-carrying structure comprising a yaw system and a control system;
   a generator comprising a rotating part interoperable with a stationary part, the stationary part is connectable to the load-carrying structure;
   a support structure comprising an electrical system, the support structure is connectable to the load-carrying structure;
   a segmented housing is connectable to at least the load-carrying structure,
   wherein the generator, the load-carrying structure and the support structure are separate modules,
   wherein the separate modules and the segmented housing are connectable at an erection site of the wind turbine to build the nacelle,
   wherein the generator comprises a hydraulic unit which comprises a pump mounted to the stationary part of the generator, and
   wherein a hydraulic connection leads from the hydraulic pump to brakes of the generator.

2. The nacelle for a wind turbine according to claim 1, wherein the electrical system comprises a transformer and a converter, to adapt the power of the generator to apply to a power grid condition of a power grid.

3. The nacelle for a wind turbine according to claim 1, wherein a platform to be used with a helicopter is provided that is connectable to the housing.

4. The nacelle for a wind turbine according to claim 1, wherein the electrical system is electrically connectable to the generator and the power grid.

5. The nacelle for a wind turbine according to claim 1, wherein a pipe or hose of the cooling system is connectable to the radiator, the generator and/or the electrical system.

6. The nacelle for a wind turbine according to claim 1, wherein at least the generator and the electrical system of the support structure are constructed to be connected by an electrical connection.

7. The nacelle for a wind turbine according to claim 1, wherein at least the cooling system in the load-carrying structure, the generator and the electrical system of the support structure are constructed to be connected by a connection for a cooling fluid.

8. The nacelle for a wind turbine according to claim 1, wherein at least the hydraulic unit at the generator and the control system of the support structure are constructed to be connected by a hydraulic connection.

9. The nacelle for a wind turbine according to claim 1, wherein at least the hydraulic unit at the generator and a hydraulic component outside of the nacelle are constructed to be connected by a hydraulic connection.

10. The nacelle for a wind turbine according to claim 1, wherein at least the control system in the load-carrying structure, the generator and the electrical system in the support structure are constructed to be connected by an electrical connection.

11. The nacelle for a wind turbine according to claim 1, wherein at least the control system and a component outside of the nacelle are constructed to be connected by an electrical connection.

12. A method to assemble at the erection site of the wind turbine a nacelle according to claim 1, comprising:
   connecting the stationary part of the generator to the load-carrying structure;
   connecting the support structure to the load-carrying structure; and
   connecting the segments of the housing at least to the load-carrying structure.

13. The nacelle for a wind turbine according to claim 1, wherein the load-carrying structure comprises at least a part of a cooling system.

14. The nacelle for a wind turbine according to claim 13, wherein a radiator is provided connectable to the housing.

* * * * *